United States Patent
Jentzsch et al.

(10) Patent No.: US 12,045,805 B2
(45) Date of Patent: Jul. 23, 2024

(54) MULTISIGNATURE KEY CUSTODY, KEY CUSTOMIZATION, AND PRIVACY SERVICE

(71) Applicant: Blockchains, Inc., Sparks, NV (US)

(72) Inventors: Christoph Jentzsch, Mittweida (DE); Simon Jentzsch, Mittweida (DE); Steffen Kux, Mittweida (DE)

(73) Assignee: Blockchains, Inc., Sparks, NV (US)

( * ) Notice: Subject to any disclaimer, the term of this patent is extended or adjusted under 35 U.S.C. 154(b) by 345 days.

(21) Appl. No.: 17/501,947

(22) Filed: Oct. 14, 2021

(65) Prior Publication Data

US 2022/0116214 A1 Apr. 14, 2022

Related U.S. Application Data

(60) Provisional application No. 63/136,124, filed on Jan. 11, 2021, provisional application No. 63/091,492, filed on Oct. 14, 2020.

(51) Int. Cl.
*G06Q 20/36* (2012.01)
*G06Q 20/38* (2012.01)
(Continued)

(52) U.S. Cl.
CPC ......... *G06Q 20/36* (2013.01); *G06Q 20/3821* (2013.01); *G06Q 20/3829* (2013.01);
(Continued)

(58) Field of Classification Search
CPC ............... G06Q 20/36; G06Q 20/3821; G06Q 20/3829; G06Q 2220/00; H04L 9/0825;
(Continued)

(56) References Cited

U.S. PATENT DOCUMENTS 10,628,807 B2 4/2020 White
11,640,601 B2 5/2023 Huang et al.
(Continued)

OTHER PUBLICATIONS

Maffre, J., "What is an Ethereum keystore file?," Dec. 10, 2017, pp. 1-9, [Online] [Retrieved on Jan. 6, 2022] Retrieved from the Internet <URL: https://julien-maffre.medium.com/what-is-an-ethereum-keystore-file-86c8c5917b97>.
(Continued)

*Primary Examiner* — Jonathan A Bui
(74) *Attorney, Agent, or Firm* — PIERCE ATWOOD LLP

(57) ABSTRACT

Users of a multisignature wallet can customize keys to initiate various transactions. As a user specifies roles to customize keys, a smart contract is updated to associate the roles with the keys, where the customized keys are then associated with the user's multisignature wallet. The user may perform transactions by signing using the key or an address of the key, where a transaction can be processed upon verifying the key and its role. Additionally, a privacy service can facilitate blockchain transactions initiated using a key of a multisignature wallet. The privacy service receives a transaction signed by a key of the multisignature wallet and identifies a proxy wallet using the key. The privacy service validates and signs the transaction, which is then sent to a proxy wallet. The proxy wallet can cause a blockchain transaction to be executed.

21 Claims, 13 Drawing Sheets

(51) Int. Cl.
    *H04L 9/00*               (2022.01)
    *H04L 9/08*               (2006.01)
    *H04L 9/32*               (2006.01)

(52) U.S. Cl.
    CPC .......... *H04L 9/0825* (2013.01); *H04L 9/0894* (2013.01); *H04L 9/3247* (2013.01); *G06Q 2220/00* (2013.01); *H04L 9/50* (2022.05); *H04L 2209/46* (2013.01); *H04L 2209/56* (2013.01)

(58) Field of Classification Search
    CPC ....... H04L 9/0894; H04L 9/3247; H04L 9/50; H04L 2209/56
    See application file for complete search history.

(56) References Cited

U.S. PATENT DOCUMENTS

| | | |
|---|---|---|
| 2002/0184504 A1 | 12/2002 | Hughes |
| 2016/0275461 A1 | 9/2016 | Sprague et al. |
| 2017/0048235 A1 | 2/2017 | Lohe et al. |
| 2017/0085545 A1* | 3/2017 | Lohe ...................... G06Q 20/10 |
| 2019/0057382 A1* | 2/2019 | Wright .................... H04L 9/321 |
| 2019/0266576 A1 | 8/2019 | McCauley et al. |
| 2020/0280440 A1* | 9/2020 | Bollen ................ G06Q 20/382 |
| 2021/0312431 A1 | 10/2021 | Ravinathan et al. |
| 2021/0320806 A1* | 10/2021 | Boudreault ........... H04L 9/3242 |
| 2022/0114578 A1 | 4/2022 | Jentzsch et al. |
| 2022/0327530 A1 | 10/2022 | Pagter et al. |

OTHER PUBLICATIONS

Van De Sande, A., "EIP-1078: Universal login / signup using ENS subdomains," Ethereum Improvement Proposals, No. 1078, May 2018, pp. 1-7, [Online] [Retrieved on Jan. 6, 2022] Retrieved from the Internet <URL: https://eips.ethereum.org/EIPS/eip-1078>.
PCT International Search Report and Written Opinion, PCT Application No. PCT/US2021/055097, Jan. 24, 2022, 16 pages.

* cited by examiner

*Executing transaction using salted hash from multisig – privacy disclosed*

MULTISIGNATURE KEY CUSTODY, KEY CUSTOMIZATION, AND PRIVACY SERVICE

CROSS REFERENCE TO RELATED APPLICATIONS

This application claims the benefit of U.S. Provisional Application No. 63/091,492, filed Oct. 14, 2020, and U.S. Provisional Application No. 63/136,124, filed Jan. 11, 2021, which are incorporated by reference in their entirety.

TECHNICAL FIELD

The disclosure generally relates to the field of blockchains, and specifically relates to enhanced security of blockchain keys.

BACKGROUND

Multi-signature wallets require multiple signatures from different keys in order to complete a transaction. Typically these keys are all equal—to sign a transaction for completion, where, for example for a three of five multisignature wallet, if three signatures are received, then the transaction will be completed. Users who store their own keys on their own devices, rather than having them managed by a custody provider, are responsible on their own to keep the keys secure and safe (e.g., from misuse and/or loss), which may result in unintentional loss.

Additionally, while blockchain transactions are anonymous insofar that transactions are performed to and from blockchain addresses, which by themselves do not reveal identities of owners, malicious users may be able to leverage the property of transparency in blockchain transactions to nonetheless infer certain information about a user. This is because when a transaction is performed by a user, the user's address becomes public, and information may be derived based on the address (e.g., the user's balance on that address, past and future incoming and outgoing transactions, etc.).

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
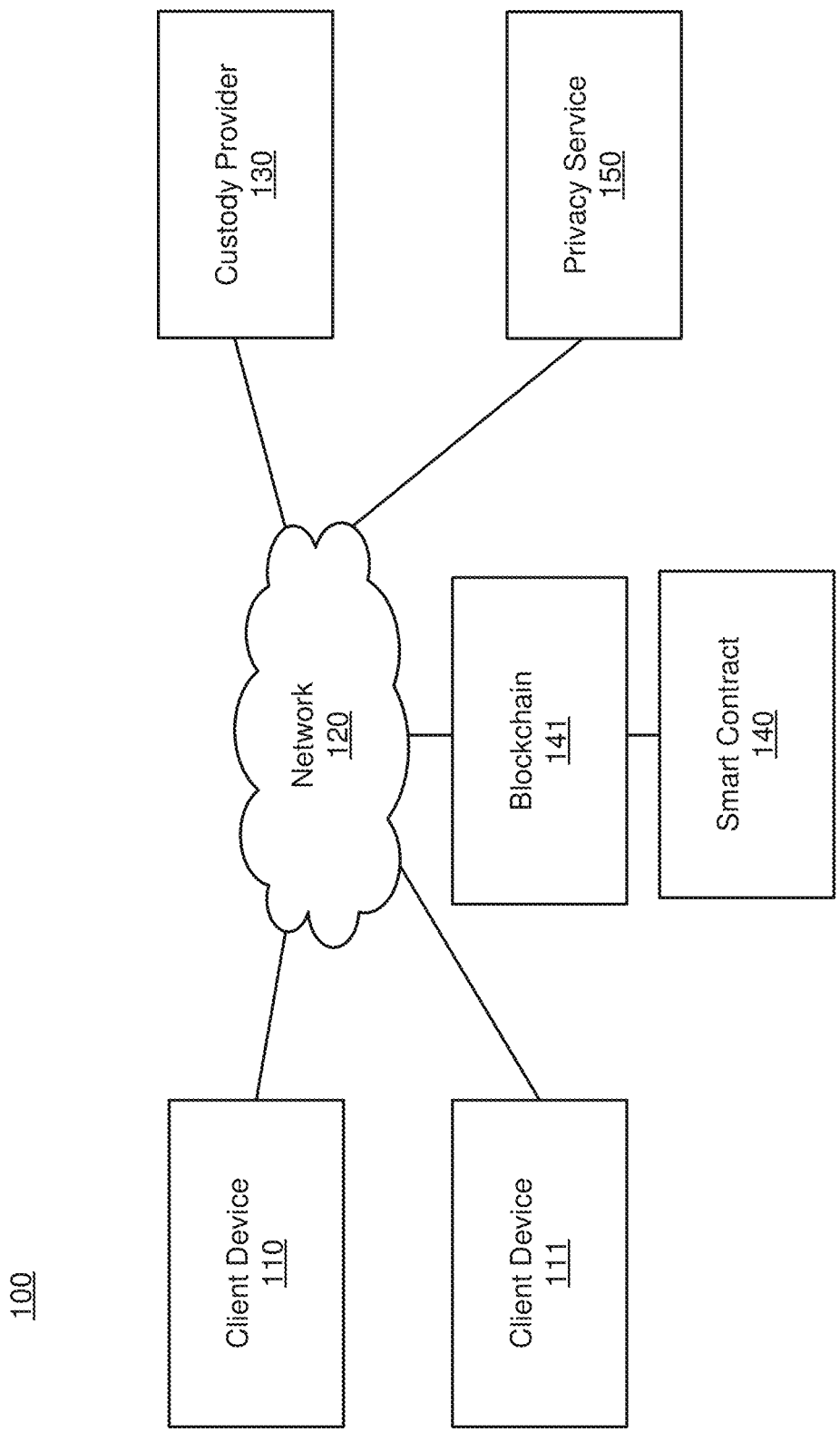
FIG. 1 illustrates one example configuration of a system environment for customization and remote custody of keys, in accordance with an embodiment.

The FIGS. and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium is provided herein for enabling customization of keys by users. A command may be received, by a user interface, to assign a role to a key or keypair (e.g., public and private keys). Responsive to receiving the command, an API operably coupled with the user interface may transmit an update to a smart contract to associate the role with the key (e.g., the public key of a keypair), where the key is associated with a multisignature wallet (e.g., a wallet that maintains the private key of the keypair). The API may receive a request to initiate a transaction, the transaction affected based on whether a key having the assigned role signs the transaction. Responsive to the key having the assigned role signing the transaction, the transaction is affected in a manner. For example, the key may be an approval key that, when signing a transaction initiated by an initiation key, causes the transaction to be executed.

In another embodiment of a disclosed system, method and computer readable storage medium is provided herein for initiating a transaction using a privacy service. A privacy service receives a blockchain transaction signed by at least a proxy key of a multisignature wallet (e.g., the blockchain transaction may be signed by initiation, approval, and/or proxy keys of a multisignature wallet). The privacy service identifies a proxy wallet based on the proxy key (e.g., using the address of the proxy key). The blockchain transaction is validated (e.g., using one or more addresses corresponding, respectively, to one or more initiation and/or approval keys) and in response to the validation, the privacy service signs the blockchain transaction (e.g., using a privacy service key). The privacy service forwards the signed blockchain transaction to the proxy wallet. In some embodiments, the proxy wallet is associated with both the proxy key and the privacy service key, which can be used together to sign the blockchain transaction. A signature by a key or combination of keys of the proxy wallet can cause the blockchain transaction to be executed.

Example System Environment for Customization and Remote Custody of Keys

FIG. 1 illustrates one example configuration of a system environment for customization and remote custody of keys, in an accordance with an embodiment. FIG. 1 depicts environment 100, which includes client device 110, client device 111, network 120, custody provider 130, blockchain 141, multisignature smart contract 140, and privacy service 150. Client device 110 and client device 111 are end-user devices. Client device 110 and client device 111 may be devices of a same user or of different users. Additional client devices may be present in environment 100. A client device may output a user interface for display to a user. The user interface may be operable by the user to cause a key to be generated, to assign a role to a key, and to initiate requests in connection with smart contract 140. The user interface may be generated by an application of a multisignature wallet that has an application programming interface (API) operable to update multisignature smart contract 140. As referred to herein, the terms "multisignature" and "multisig" may be used interchangeably. The application may be installed on a client device, or may be accessed using a browser (e.g., by navigating using the browser to a web page provided by a web server that hosts the user interface). Client devices 110 and 111 store private keys that are generated by those devices.

The user interface enables a user to assign different roles to keys, thus enabling use of those keys to perform different functions (e.g., in connection with signing a transaction). For example, the user interface may include selectable options that, when selected, cause roles to be assigned to keys associated with a user account. Some exemplary roles include a role of being an "initiation key", an "approval key", a "veto key", and a "recovery key." The initiation key may perform an initiation function, the approval key may perform an approval function, the veto key may perform a veto function, and a recovery key may perform a recovery function. The user interface enables the user to assign one, or several, roles to a single key with respect to a given transaction. Responsive to receiving an assignment of a role to a key, multisig smart contract 140 is updated to indicate the role of the key with respect to the affected transaction. Alternatively, once a role is assigned, the role may remain in effect until challenged (e.g., the role is effective for multiple transactions until challenged).

The term initiation key, as used herein, may refer to a key that has been assigned an initiation role. Such a key may be used to perform an initiation function (e.g., to initiate a transaction). For example, an initiation key may be used to sign a transaction request. The transaction may have a requirement that one or more approval keys sign the transaction. The term "approval key," as used herein, may refer to a key that has been assigned an approval role. An approval key may be used to perform an approval function (e.g., to sign a transaction in order to validate the transaction and cause it to be executed). The term "veto key" may refer to a key that has been assigned a veto role. A veto key may be used to perform a veto function (e.g., to cancel a transaction, for example, by signing the transaction within a selected period of time relative to when an initiation key signed the transaction). The term "recovery key" as used herein may refer to a key that has been assigned a recovery role. A recovery key may be used to perform a recovery function (e.g., to replace keys). For example, the recovery key may remove a key that was previously assigned a certain role (e.g., an initiation role or an approval role), and/or assign that role to a different key. These roles of keys are described in further detail below with respect to FIGS. 4-6. Any other role may be assigned as well and is in the scope of this disclosure.

Network 120 provides a communication infrastructure between client device 110, and blockchain 141 (on which multisig smart contract 140 may run, through which multisig smart contract 140 may be communicated with). Network 120 also provides a communication infrastructure between blockchain 141 and custody provider 130. Network 120 is typically the Internet, but may be any one or more networks, including but not limited to a Local Area Network (LAN), a Metropolitan Area Network (MAN), a Wide Area Network (WAN), a mobile wired or wireless network, a private network, or a virtual private network.

Custody provider 130 generates private keys and stores those keys in a secure way. Custody provider 130 may additionally house and enforce policies associated with keys. Further details of the activity of custody provider 130 are described in further detail below with respect to FIG. 2.

Multisig smart contract 140 comprises program code for use with an electronic distributed ledger. In one embodiment, the electronic distributed ledger is a blockchain 141. In one embodiment, multisig smart contract 140 includes rules/logic for validating and/or effectuating transactions that are stored in blocks of blockchain 141. For example, a user of a client device, such as client device 110, sends a transaction to blockchain 141 (e.g., signed with needed signatures from private keys held by the user). This may be a simple send transaction (e.g., to move crypto currency), or may be a transaction that triggers a function (e.g., corresponding to a role of a key) in smart contract 140 (which may be, e.g., a multisig smart contract). Smart contract 140 defines rules/logic about how the state of blockchain 141 is changed during a transaction (e.g., storing a value in a state variable).

In some embodiments, smart contract 140 stores addresses attached to roles of keys. For instance, a suitable key generation technique may be used to generate a public-private key pair (e.g., by randomly selecting a private key and generating a public key from the private key). The public address of this key pair may be assigned a certain role. For example, the corresponding public key of this key pair may be used to derive a public address. The public address may be registered with smart contract 140 as having the assigned role. In order to trigger a transaction, smart contract 140 is used to determine whether signatures that are needed according to the roles are attached (e.g., it is checked that the signatures fit to these addresses assigned to the roles). Further particulars about roles and their corresponding signatures are described in further detail below. However, it should be appreciated that aspects of the present disclosure are not limited to storing addresses. In some embodiments, smart contract 140 may store public keys, in addition to, or instead of, addresses.

The rights to use a key may change hands or be overruled, which may be updated in smart contract 140. In an embodiment, a user may have (either stored on their client device or within custody provider 130) a special dapp key, which is a key that can sign on behalf of the user in the dapp context. Dapp keys are created by and in full control of the user and are assigned to the dapp using technologies like wallet connect or a web3 injection into the dapp's web side. Dapp keys may be used consistent with the manner that keys are discussed below.

Privacy service 150 is a centralized service for providing users access to a proxy wallet, through which the users' multisig transactions are anonymized. Privacy service 150 is described in further detail below with reference to FIGS. 7-9.

Figure 2:
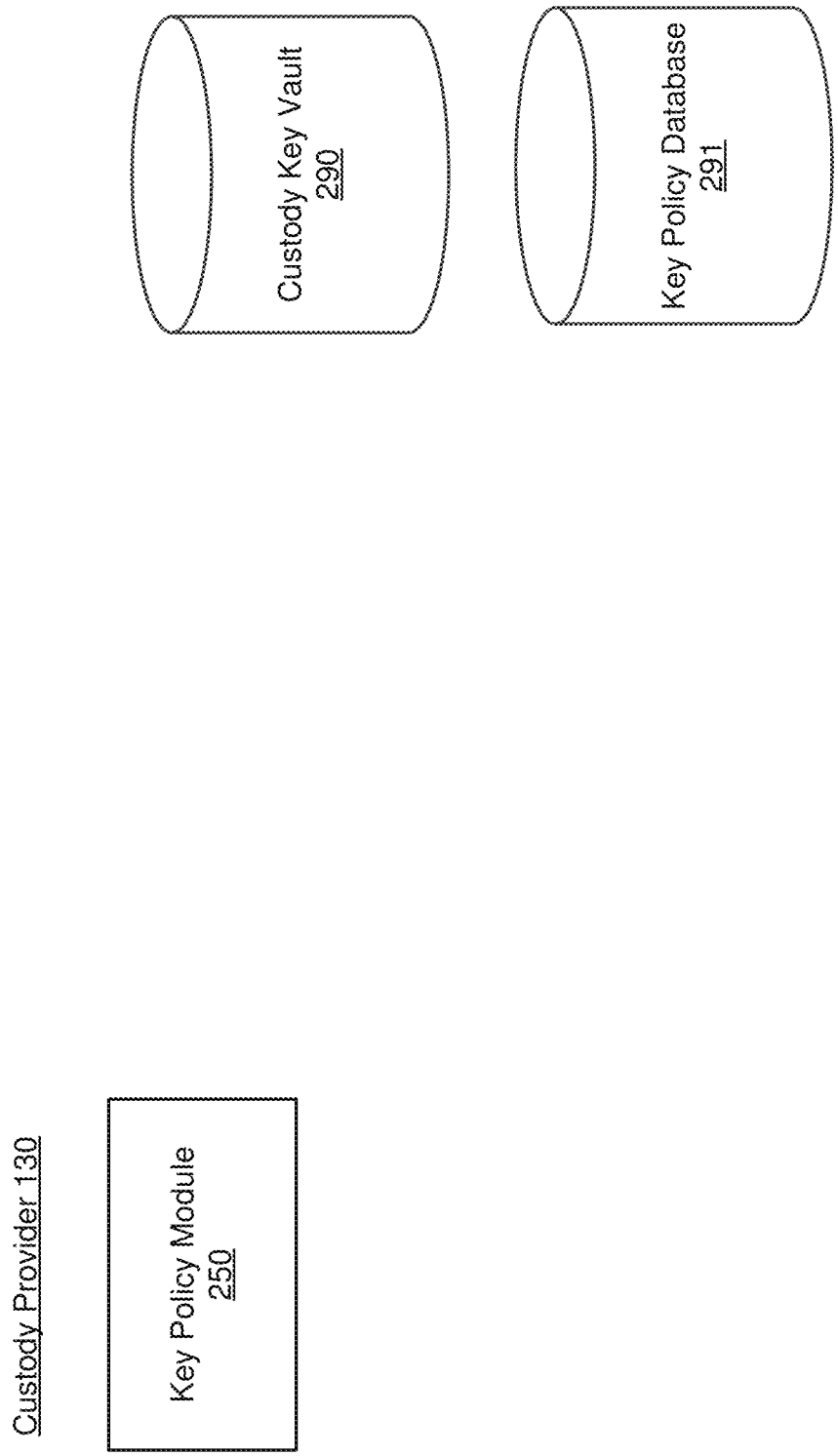
FIG. 2 illustrates one embodiment of elements of a custody provider for generating and operating customized keys.

FIG. 2 illustrates one embodiment of elements of a custody provider for generating and operating customized keys. Custody provider 130 includes various stores, such as custody key vault 290, as well as key policy database 291. Custody provider 130 also includes key policy module 250. Fewer or aspects may be used by custody provider 130 to perform the activity disclosed herein; the depicted modules and databases are merely exemplary tools for performing the disclosed functionality.

Custody key vault 290 may store keys in hot storage, cold storage, or frozen storage. The term hot storage, as used herein, may refer to a network-connected storage where keys stored therein are ready to be used for signing after a successful authentication. The term cold storage, as used herein, may refer to storage that is not network-connected, requiring physical access to use stored keys for signature. In an embodiment (e.g., for business processes), cold storage may include keys in an air gapped facility (e.g., no connection at all to the Internet). To use a cold storage key, a manual process involving a mobile device is used to obtain a signature (e.g. a message to be signed is stored at a mobile data storage, such as a secured USB flash drive). The mobile device is connected to the air gapped system, the signature is generated and again stored at this device, and then manually moved to a connected system for inclusion of the signature in the transaction. In an embodiment (e.g., personal use), to use a cold storage key, signing may occur via insertion of the cold storage into a network-enabled device, such as insertion of a universal serial bus (USB) drive that stores the key into a personal computer. The term frozen storage, as used herein, may refer to storage that is not network-connected, and that is stored on metal plates with no ready access to network connectivity. A user may access keys in custody key vault 290 after being authenticated through one or more verification techniques, such as biometrics (e.g., any of a vein scanner, fingerprint authentication, an iris scan, facial recognition, etc.), a password, a memory puzzle, code verification via text message to the user's client device 110), and the like. A user interface may be presented at custody provider 130 that operates in a similar manner to that described with respect to client devices 110 and 111.

The custody key vault offers a solution that is technically and architecturally secured against unauthorized access and sabotage, and that all devices are protected against failure and manipulation in a redundant manner. Even with physical access it is not possible to access the keys. For example, to establish custody provider 130, several high-security datacenters distributed all over the world may be operated in different countries. Each of these data centers houses a secure IT infrastructure, the core of which are Hardware Security Machines (HSM). Keys are stored in these HSMs and cannot leave them under any circumstances (secure by design). These keys can be used to generate signatures via high-security access. Access to the HSMs is not possible directly. The only way to have a transaction or similar signed with such a key is to interact via a multiple secured API. The security is multi-level.

Key policy module 250 optionally applies one or more policies to use of any given key stored in custody key vault 290 (also referred to herein as "custody keys"). Policies may be generated by default (e.g., all custody keys by default require a successful entry of a username or password for use), by an administrator, and/or by a user of client device 111. When a user attempts to use a custody key for any given purpose, key policy module 250 accesses an entry of key policy database 291 that corresponds to the custody key being used and determines therefrom one or more policies. The policies may include any, all, or a combination of successful entry of a username and/or password, successful biometric verification (e.g., fingerprint scan, retinal scan, voice scan, face scan, etc.), and the like. In an embodiment, key policy module 250 selectively applies policies. For example, key policy module 250 may determine whether a user has satisfied a compliance check (e.g., earlier in a session, the user was prompted to comply with a policy). In one example of a compliance check, key policy module 250 may receive metadata of the transaction such as the purpose of a transaction. Key policy module 250 may then check the metadata against compliance rules such as Know Your Transactions (KYT) or Anti-Money Laundering (AML) compliance rules. In one non-limiting example, key policy module 250 may grant access to a key in the custody key vault 209 only after a compliance policy has been satisfied. Key policy module 250 may make keys guarded by policies that have not yet been complied with inaccessible to a user. In an embodiment, key policy module 250 may make it impossible to use custody keys without satisfying a compliance check of the policy or policies that apply to those keys. In such scenarios, signatures are prevented from being created to execute a transaction until compliance is verified.

Figure 3:
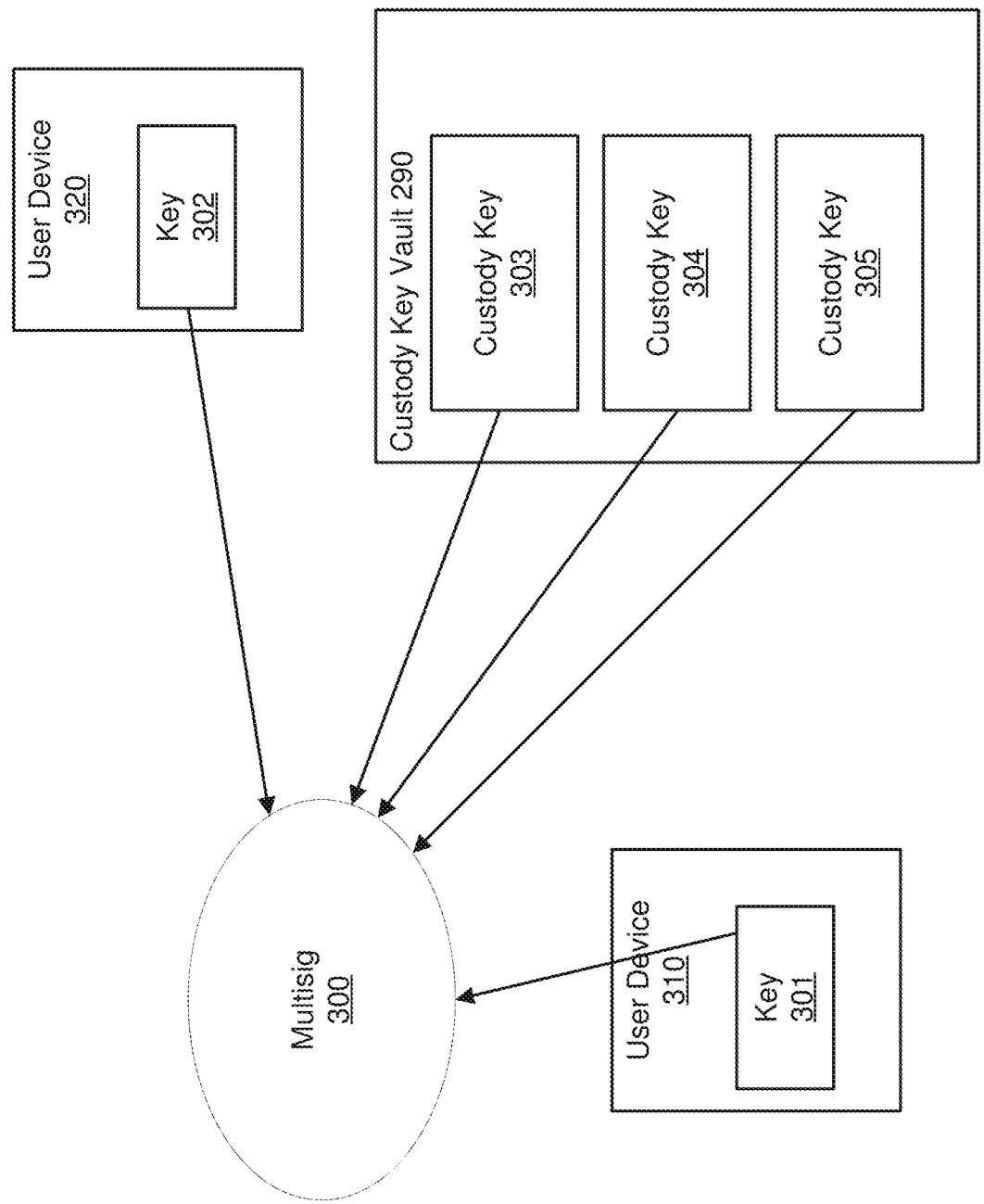
FIG. 3 depicts a multisignature contract where keys are obtained from two or more sources.

FIG. 3 depicts a multisignature contract where keys are obtained from two or more sources. In some embodiments, addresses of the keys are provided to multisig contract 300 (e.g., in place of the keys themselves). For example, addresses of public keys may be provided to multisig contract 300. Multisig contract 300 has transactions that are requested by a user verified by using public keys or addresses of the public keys that satisfy the requisite roles. For example, multisig contract 300 may verify that the received address of a public key of a keypair (e.g., public and private keys) matches the recorded address of the public key that was previously assigned a particular role. Additionally, or alternatively, multisig contract 300 may verify a received transaction by using the recorded address of the public key that was previously assigned a particular role to verify a signature generated over the transaction, where the signature is allegedly generated using a private key corresponding to the public key. Any suitable signature verification technique may be used, such as a signature verification technique corresponding to a key generation technique used to generate the public key and the corresponding private key. The private keys may be located on one or more of the user's devices, such as user devices 310 and 320, which hold keys 301 and 302, respectively. The same transaction may also need to be signed off by one or more custody keys 303, 304, and 305, depending on the roles of those custody keys and the roles required by multisig contract 300. Contracts 140 and 300 may be the same contract or different implementations of a multisignature contract.

Multisig contract 300 may be associated with any number of keys, where a subset are initiation keys and/or approval keys. For example, a multisignature contract may have seven keys, where two of those seven keys are initiation keys, and five of those keys are approval keys, where at least two of the approval keys must sign a transaction initiated by an initiation key for the transaction to process. For instance, a single initiation key may be used to initiate a transaction, and a requisite number of approval keys may be required to sign the transaction in order for the transaction to be executed. An exemplary approval key process is discussed below with respect to FIG. 4.

A daily limit may be included in the multisig contract 300, which allows a user to sign a transaction with one key only (e.g., an initiation key), rather than a requisite number of threshold keys (e.g., initiation and/or approval keys), up to a number of times equal to the daily limit. From that point forward, the requisite number of keys would be required to execute the transaction. The term daily is exemplary, and this limit may apply to any length of time. The daily limit may be input into the user interface of the multisig wallet application by the user and then assigned to the multisig contract 300. The multisig wallet application may be a software application that is executable by a client device and includes various software modules for generating a user interface for assigning roles to keys based on a user's customization requests and processing requests to sign transactions using the keys. The multisig wallet application may perform functions described herein with reference to a multisignature wallet (e.g., multisig wallet 410, 510, 610, 710, 810, or 910, or recovery wallet 620) or custody provider 130.

With regard to access policies, an access policy may be required in order for a key to be used to successfully sign a transaction. The access policy may be a conventional access policy. For example, a PIN, password, two-factor authentication, or biometric (e.g., fingerprint, face, iris scans, and the like). Additionally, social access control policies may be established (e.g., ask another user on a domain to grant access to a key). Other policies may require a proof of connection to a particular network such as a given wireless (e.g., WiFi) network, local area network, or virtual private network, a proof of the user being in a given location, a usage of a defined SIM card, a use of a particular hardware device (e.g., as proven by MAC address), and the like.

Figure 4:
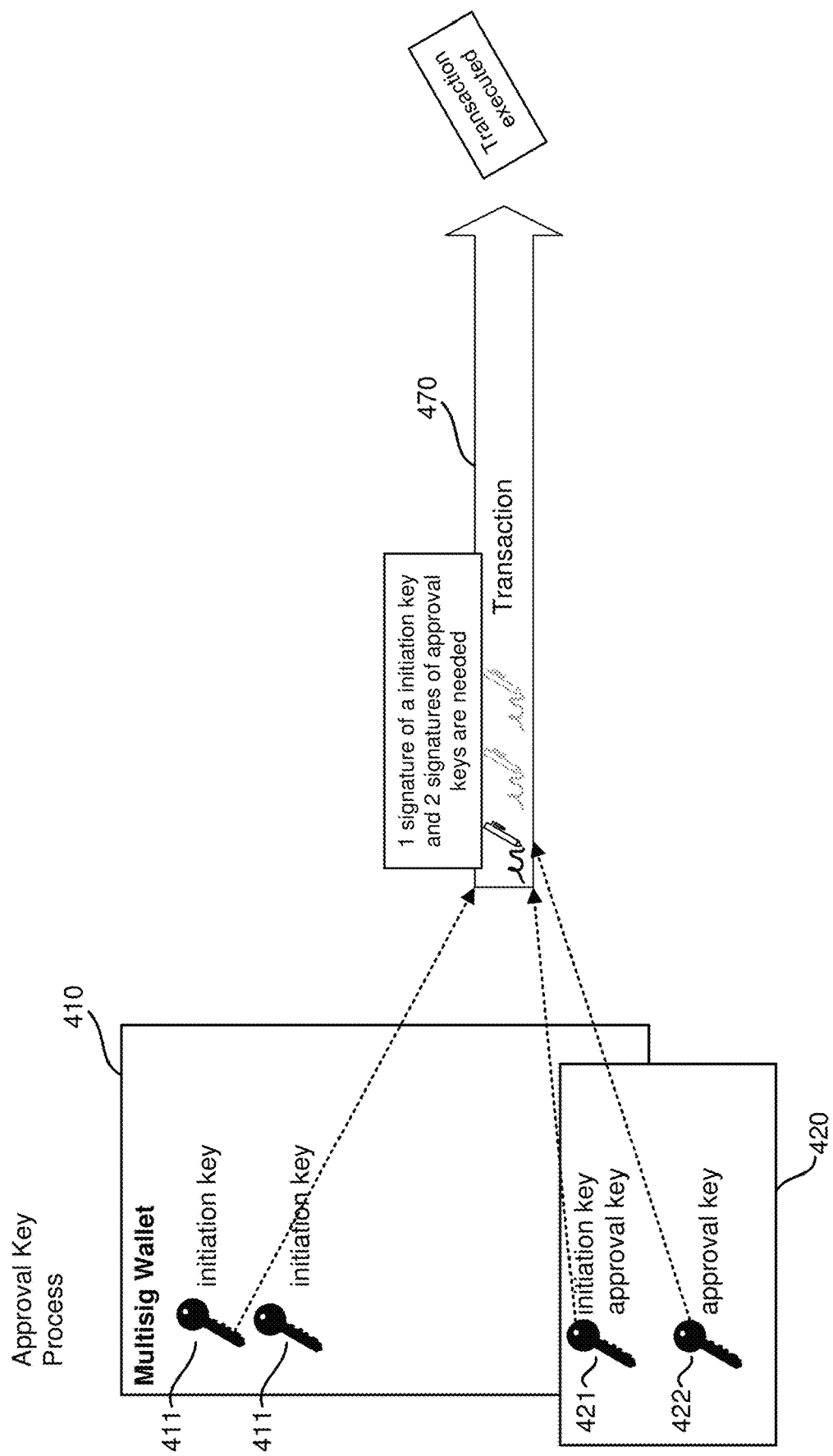
FIG. 4 depicts one embodiment of activity corresponding to an approval key process when executing a multisignature contract.

FIG. 4 depicts one embodiment of activity corresponding to an approval key process when executing a multisignature contract. An approval key process may be triggered by a user of a client device requesting performance of the transaction. The user may initiate the transaction using the aforementioned user interface of a client device (e.g., client device 110). The user interface may be provided via a software application of a multisignature wallet of multisig wallet 410 executed on the client device. This software application may be referred to herein as a "multisignature wallet application." To initiate the transaction, the user requests that the transaction 470 be signed using an initiation key (e.g., key 411), which may be associated with multisig wallet 410. The multisignature wallet application may perform the signing using the initiation key. Multisig wallet 410 may be associated with various keys. As depicted, initiation keys 411 are associated with multisig wallet 410. Approval keys 420 are also associated with multisig wallet 410. As discussed above, keys may be assigned multiple roles; key 421 is assigned a role as both an initiation key and an approval key and key 422 is assigned a role of approval key. This is merely exemplary; any roles introduced above, and/or another role, may be assigned to any of the keys of multisig wallet 410. Keys associated with multisig wallet 410 may be stored at a client device 110, at custody key vault 290, or at another storage of the user of client device 110.

Transaction 470 may be processed based on a multisignature contract (e.g., multisig contract 300) requiring that a certain number of signatures by approval keys are needed. A smart contract service (e.g., smart contract 140) or a blockchain service (e.g., blockchain 141) may perform this processing. As depicted, two approval keys are needed, though any number may be substituted for two. Should the requisite number of approval keys sign (e.g., as depicted, approval keys 421 and 422), then transaction 470 will be executed. The requisite number of keys may be determined by referencing smart contract 140, which indicates the requirements for approval of the multisignature contract, including, for example, the requisite signatures by requisite roles for a transaction to process.

Figure 5:
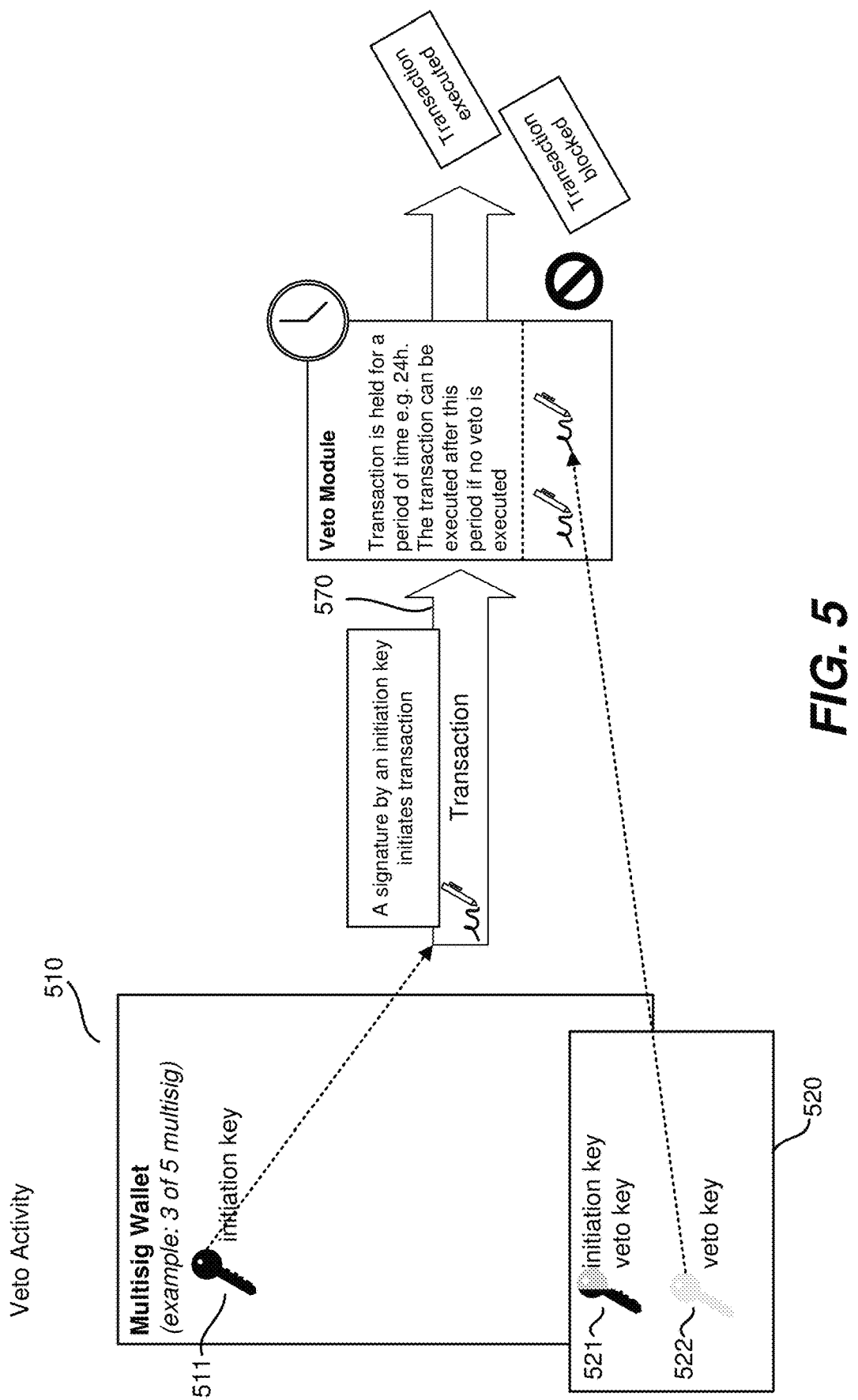
FIG. 5 depicts one embodiment of a veto process for canceling execution of a transaction of a multisignature contract.

FIG. 5 depicts one embodiment of a veto process for canceling execution of a transaction of a multisignature contract. FIG. 5 depicts multisig wallet 510 of a user (e.g., a user of client device 110). Multisig wallet 510 may include various keys. As depicted, one or more keys having a role of an initiation key (e.g., keys 511, 521) are included in multisig wallet 510. Approval keys 520 may also a part of multisig wallet 510, though they are not depicted. As discussed above, keys may be assigned multiple roles; key 521 is assigned a role of both an approval key and a veto key and key 522 is assigned a role of a veto key. This is merely exemplary; any roles introduced above may be assigned to any of the keys of multisig wallet 510. Keys in multisig wallet 510 may be stored at a client device 110, at custody key vault 290, at another storage of the user of client device 110.

As depicted in FIG. 5, key 511 may be used to initiate transaction 570 by signing the transaction (e.g., based on a user of a client device, such as client device 110, requesting through the user interface that the transaction be executed). A multisig wallet application may sign the transaction using key 511. This triggers a countdown of an interval of time, the time being associated with transaction 570, where transaction 570 may be canceled. The interval of time may be defined by the user (e.g., based on configuration input using the user interface). In order to cancel the transaction, a key with a veto role (e.g., key 521 or key 522) can sign transaction 570 within the length of time, which in turn causes transaction 570 to be canceled. If no key with a veto role signs transaction 570 during the length of time, then transaction 570 is executed (e.g., by blockchain 141). The initiation of the transaction and/or a veto may be communicated using the aforementioned API of the multisignature wallet.

Figure 6:
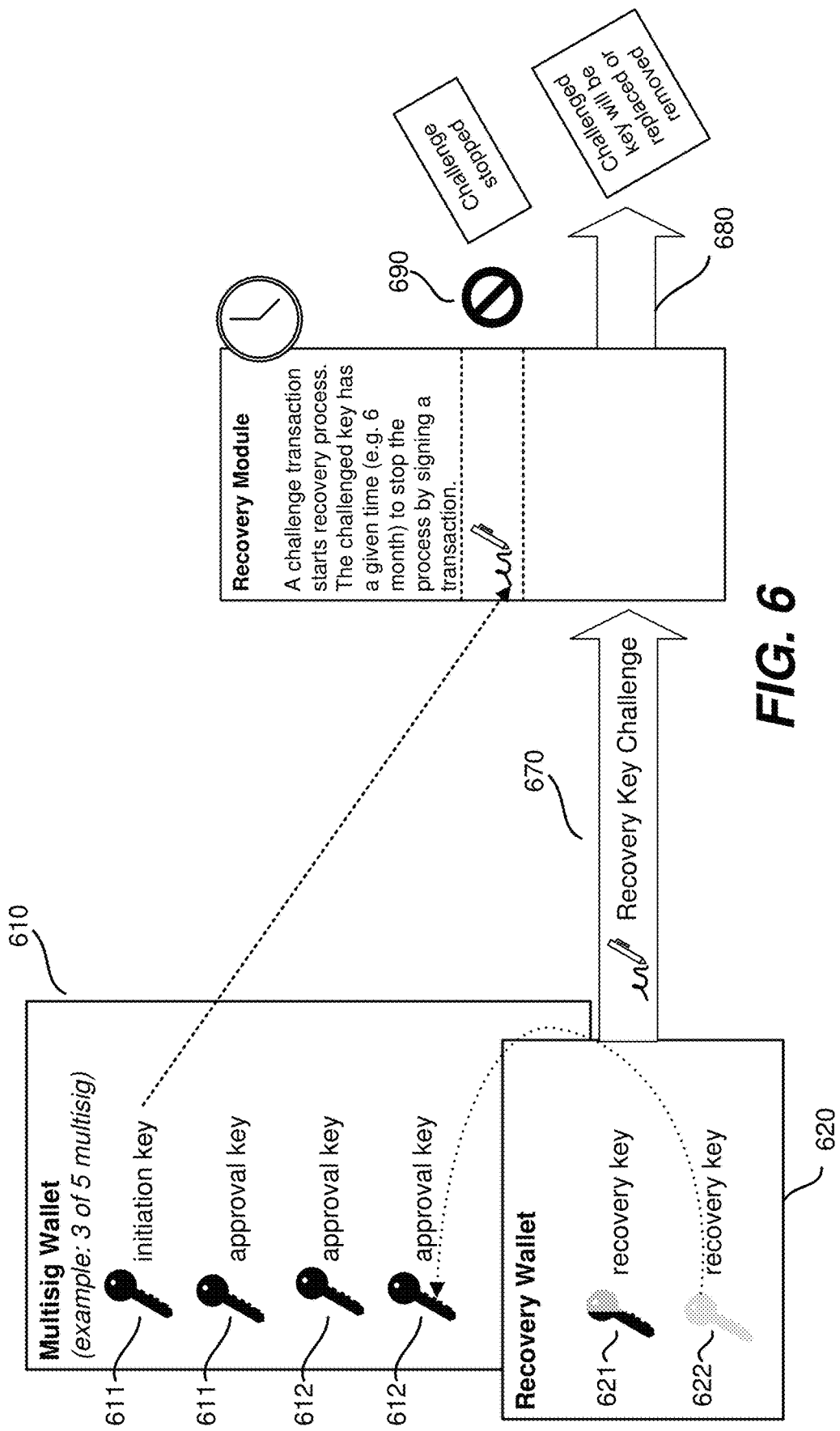
FIG. 6 illustrates one embodiment of activity of using a recovery process to challenge a key with an end goal of replacing the challenged key with a different key or removing the challenged key.

FIG. 6 illustrates one embodiment of activity of using a recovery process to challenge a key with an end goal of replacing the challenged key with a different key or removing the challenged key. In the process of FIG. 6, any key may be challenged (e.g., an initiation key or an approval key). For instance, a challenge may be performed where there is no key constellation left that can execute a transaction. Exemplary scenarios of this sort may include scenarios where there is one initiation key, two approval keys, where two signatures are needed to sign a transaction and an initiation key is lost, or both approval keys are lost. Other scenarios are in the scope of this disclosure.

As depicted in FIG. 6, a user may start a challenge, e.g., by requesting the challenge using a user interface of a client device or invoking a custodian recovery functionality of custody provider 130. The challenge, when requested, causes a recovery key (e.g., key 621 or key 622 of recovery wallet 620) to sign a transaction (e.g., 670) that starts a recovery challenge function of the relevant smart contract or a key of the relevant smart contract. Multisig wallet 610 is associated with one or more keys (e.g., initiation keys 611, approval keys 612) that may be challenged.

The user of client device 111 may have access permissions to recovery key 622. A system (e.g., multisig wallet application located at a client device or custody provider 130) detects that recovery key 622 has started the challenge function, responsively initiates a challenge transaction, and challenges the key (e.g., key 611 is challenged). The challenge transaction initiates the beginning of a length of time, during which the challenged key may sign a transaction sent to stop the challenge (e.g., by calling a stop challenge function of the relevant smart contract). Responsive to detecting that the period of time has lapsed without the challenged key signing the transaction, a recovery activity 680 is performed. Recovery activity 680 may include replacement or removal of the challenged key (e.g., by assigning the role of the challenged key to the challenging key or a different key). Responsive to detecting that the challenged key signed a transaction calling the stop challenge method the challenge is stopped 690.

In some embodiments, recovery wallet 620 prepares a challenge transaction and uses recover key 621 or 622 to sign that transaction. The transaction is then sent to the smart contract within the blockchain. If the transaction is successfully verified using the public key or the address of the public key corresponding to the recovery key, the smart contract replaces the challenged key (e.g., after a waiting period).

In some scenarios, the period for recovery may be very long (e.g., 6 months or one year), and it may be unacceptable to have to wait such a long period of time to recover an account. For example, where the user of client device 111 loses client device 111, and a key desired for use by the user was only stored at that client device 111, then the user may have to wait a year to recover using a recovery key stored at a different client device (e.g., client device 110). To reduce the probability of such an outcome, the user may apply other keys to reduce the recovery time (e.g., using the aforementioned API of the multisig wallet application). To this end, the system may detect that a challenge is signed by other keys of the user (e.g., other recovery and/or approval keys), thus proving that the user is in possession of those other keys. Responsive to detecting such a signature, the length of time may be reduced (e.g., from six months to one month, and then from one month to two days). The amount of time reduced may be default or may be programmed by the user in connection with setting up a recovery key. The reduction of time may increase based on a number of successful signatures to the recovery challenge by the user. In some embodiments, a smart contract checks a received signature, which is allegedly generated using the challenged key or other keys previously assigned to roles by the user, by using the public keys or address(es) of the challenged key or the other keys to verify the signature (e.g., using a cryptographic signature verification technique corresponding to the cryptographic key generation technique used to generate the challenged key or the other keys). In some embodiments, a public address may be used to look up (e.g., from the blockchain) or otherwise determine a corresponding public key, and the public key may be used for signature verification. Additionally, or alternatively, the public address may be used directly for signature verification. In this way, the smart contract can determine if the signature is valid and reduce the length of time accordingly.

In an example embodiment, a "dead man" switch is implemented as a particular form of the recovery process. For example, if a user (e.g., owner) of multisig wallet 610 passed away or is incapacitated, using conventional systems, other users, like a surviving spouse, may wish to access and use the keys of multisig wallet 610, but may be unable to do so because there is no mechanism to challenge the incapacitated owner's rights. To guard against such a scenario, recovery key 622 may be programmed to challenge, e.g., all keys connected to multisig wallet 610. If more than one key is to be challenged, this may be performed using two independent challenges. Recovery key 622 may be configured to authorize particular users to challenge the threshold (initiation and/or approval) keys 611—for example, the original owner of multisig wallet 610 may authorize a spouse or family member to challenge the threshold keys 611. After the challenge succeeds against all of threshold keys 611, recovery key 622 is the only key remaining that is able to control multisig wallet 610 by replacing threshold keys 611, thus establishing the challenging user as the new owner of multisig wallet 610. The owner of recovery key 622 at this time is able to replace threshold keys 611 with newly added threshold keys to multsig wallet 610 to bolster the security of multisig wallet 610 with threshold keys of the new owner's own design.

Privacy Service

Privacy is an important issue when dealing with crypto currencies. While blockchain transactions offer anonymity, certain information of transacting users may nonetheless be revealed. For example, when a user receives or executes a payment, an address of the user is known (even though the user's exact identity is unknown), from which a balance of the user's account identified by that particular address, and all incoming and outgoing transactions of the account, can be determined.

In some embodiments, to improve privacy, a new address may be used for each transaction, where a user's wallet manages private keys corresponding to the new addresses, and accumulates account balances. To manage account balances given the use of myriad new addresses, the balances may be balanced offchain, where consistency of an offchain ledger may be proven through zero knowledge proofs on the blockchain. However, such embodiments are difficult to use and still satisfy compliance requirements for money laundering prevention. Moreover, privately held assets cannot be used directly in applications where an account is required, such as investment in an initial coin offering (ICO), participation in a decentralized autonomous organization (DAO), use of decentralized finance (DeFi), etc., and thus the offchain solution is not suitable for use in such scenarios.

Figure 7:
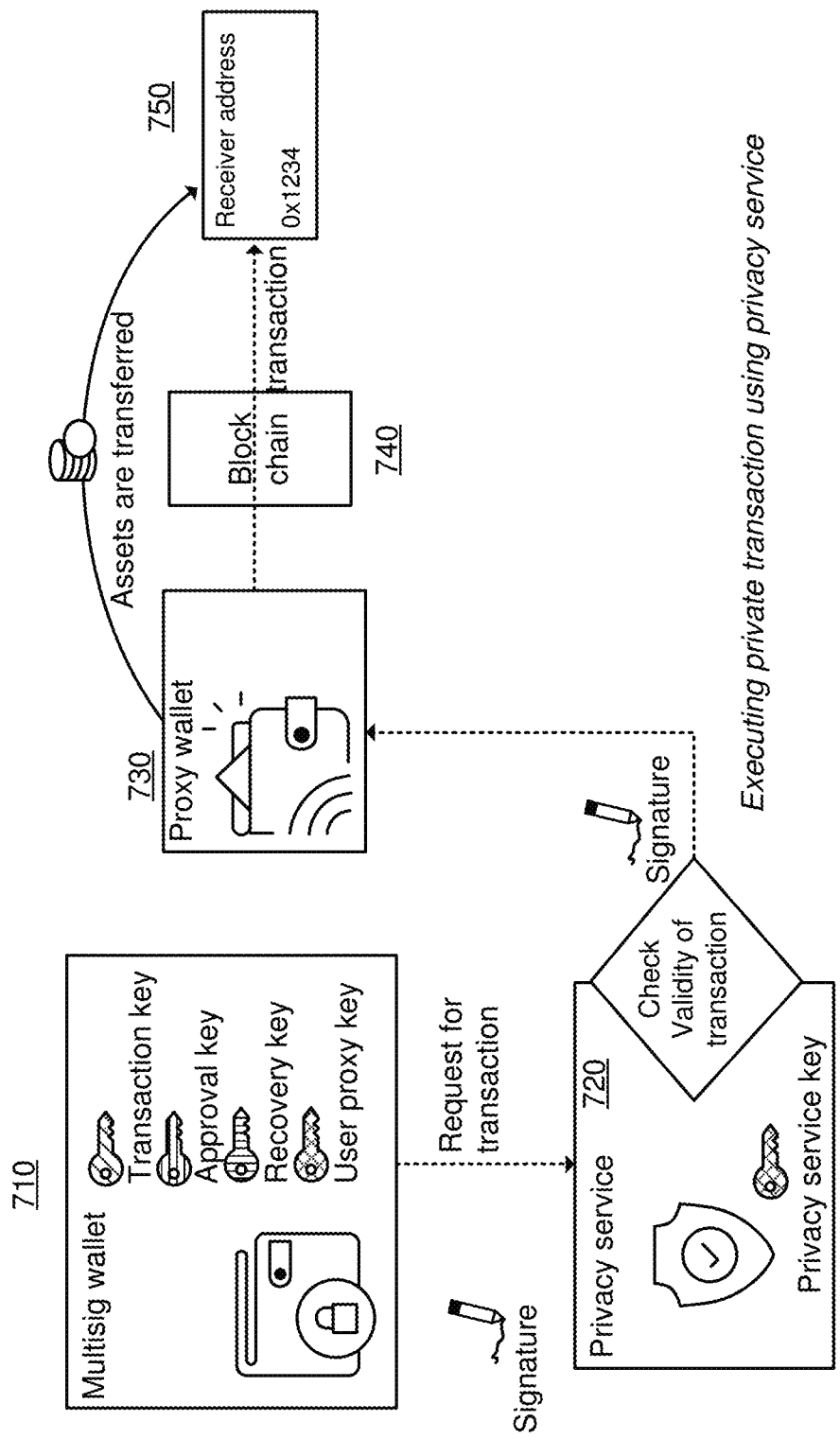
FIG. 7 depicts one embodiment of an exemplary process for using a privacy service and a proxy wallet to execute private transactions.

To ensure complete privacy of a user who makes blockchain transactions, a privacy service may be used. FIG. 7 depicts one embodiment of an exemplary process for using a privacy service and a proxy wallet to execute private transactions. The process depicted in FIG. 7 is based on a user having a separate account for each application (e.g., gaming application, social media application, navigation application, airline reservation application, etc.), thus separating all applications from each other. As long as it is ensured that there is no recognizable connection between the accounts, complete privacy of the user is ensured. By using a different address for each receiver or use case, the privacy service helps disconnect those addresses from the user and reduces a likelihood that an attacker can discover an address of a user's possessions (e.g., their multisignature wallet). Accordingly, the privacy service increases the security of a user's multisignature wallet since attackers cannot determine an address from which to begin their attacks.

FIG. 7 includes multisig wallet 710, privacy service 720, proxy wallet 730, blockchain 740, and receiver address 750. Multisig wallet 710 operates consistent with multisig wallets as described above. Multisig wallet 710 may be associated with various keys with various roles (e.g., transaction key, approval key, recovery key, as described above). Additionally, multisig wallet 710 may be associated with one or more user proxy keys. The term "user proxy key" or "proxy key," as used herein, may refer to an initiation key for a proxy wallet. This key, separate for each proxy wallet, is owned exclusively by the user in control of multisig wallet 710.

Figure 8:
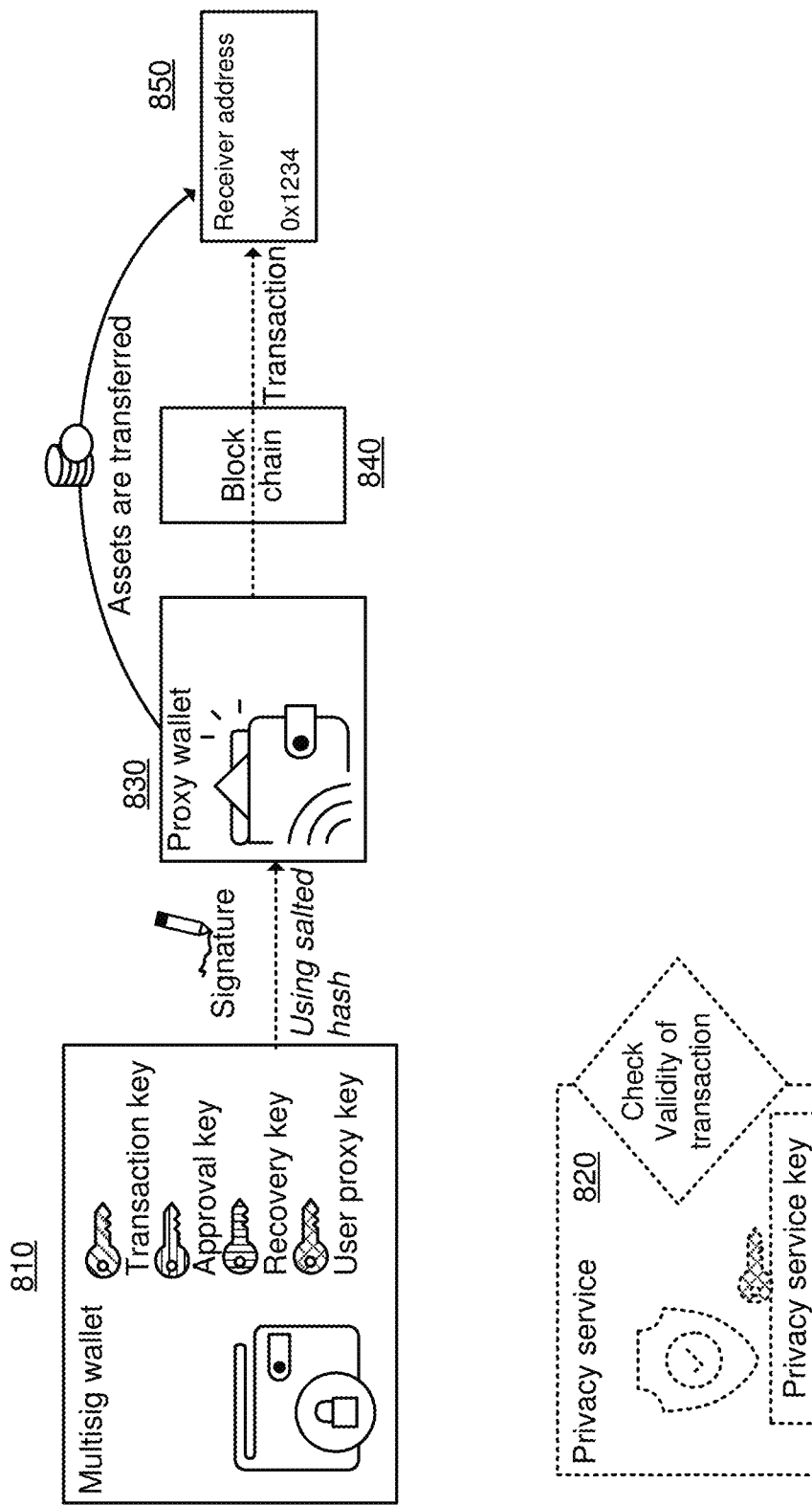
FIG. 8 depicts an exemplary process for executing a transaction with a proxy wallet using a salted hash.
Figure 9:
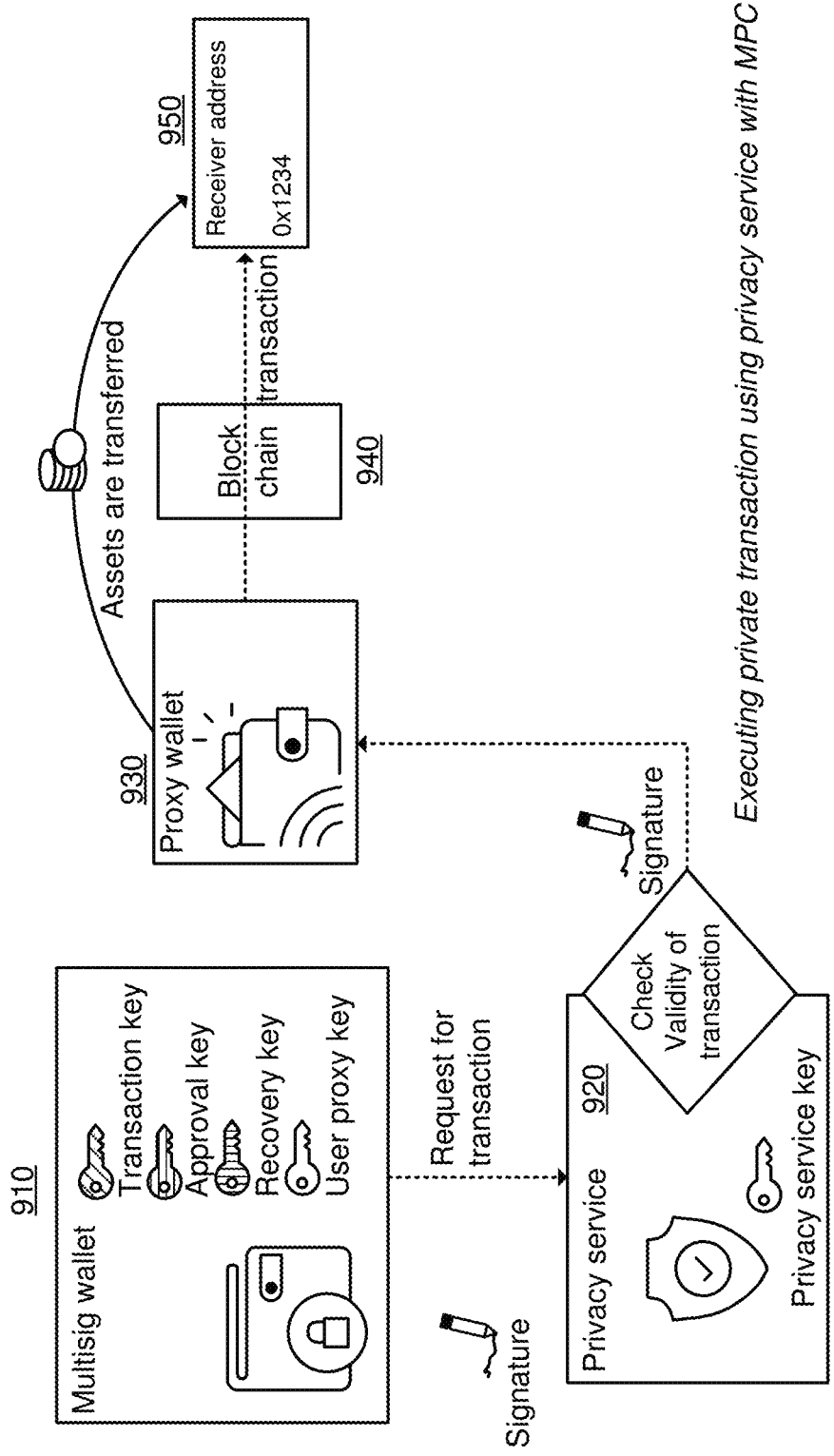
FIG. 9 depicts an exemplary process for executing a transaction with a proxy wallet using a multiparty computation signature.

Although FIGS. 7-9 depict the user proxy key as associated with a multisig wallet and the privacy service key as being associated with a privacy service (i.e., both separate from the proxy wallet), in some embodiments, the user proxy key and the privacy service key may be associated with the proxy wallet. In some embodiments, a proxy wallet is a multisignature wallet having two keys: a proxy key and a privacy service key. In response to a transaction being signed (e.g., by the proxy wallet) by signatures of both keys, the transaction may be processed (e.g., by a blockchain).

The term proxy wallet, as used herein, may refer to a multisig wallet used as a proxy for a given category of transactions. Assets are separated into different categories for management by the proxy wallet, rather than by a multisig wallet. The individual proxy wallets can then be used separately for different applications (e.g., gaming application, social media application, navigation application, airline reservation application, etc.). Proxy wallets each have an associated initiation key, which may be the user proxy key managed by multisig wallet 810. Privacy is guaranteed by using a proxy wallet for this purpose so long as the association between the proxy wallet and its corresponding multisig wallet is kept secret. In this way, the connection to the multisig is not disclosed notwithstanding the multisig being used to initiate block chain transactions.

Privacy service 720 is a service through which transactions are executed, but which at no time has control over the assets in the proxy wallet. A transaction is initiated in any manner described above, where the transaction receives the required signature(s) generated using threshold key(s) of multisig wallet 710. However, instead of sending the transaction to the block chain (e.g., block chain 141), the transaction is sent to privacy service 720. Moreover, the transaction from multisig wallet 710 is signed by the proxy key, in addition to the one or more threshold keys. Privacy service 720 checks the signatures and the validity of the transaction (e.g., that all rules of the multisig smart contract are fulfilled, compliance is satisfied, policies are satisfied, and so on consistent with the foregoing).

In response to privacy service 720 determining that the transaction is valid, privacy service 720 signs the transaction using a privacy service key, which may be an approval key of the proxy wallet 730. Privacy service 720 then forwards the transaction to proxy wallet 730, where the appropriate proxy wallet 730 is determined based on the user proxy key used to sign the transaction by multisig wallet 710. For instance, when multisig wallet 710 sends the transaction to privacy service 720, multisig wallet 710 may indicate a public address of the user proxy key, so that privacy service 720 may use the public address to identify the appropriate proxy wallet 730. Additionally, or alternatively, privacy service 720 may use a number of public addresses to separately verify the signature generated using the user proxy key. For instance, a public address may be used to look up (e.g., from the blockchain) or otherwise determine a corresponding public key, and the public key may be used for signature verification, and/or the public address may be used directly for signature verification. If one of the public addresses leads to successful signature verification, that public address may be used to identify the appropriate proxy wallet 730. In some embodiments, the appropriate proxy wallet 730 is determined based on both the user proxy key and the privacy service key (e.g., an approval key) used by privacy service 820. In this way, the connection between multisig wallet 710 and proxy wallet 730 remains secret. Requiring a signature by a user proxy key of multisig wallet 710 ensures that privacy service 720 cannot initiate a transaction on its own or modify a transaction sent by multisig wallet 710 and forwarded via the privacy service 720. After signature, the transaction is validated by blockchain 740 (which may be any blockchain 141), and the assets are transferred using receiver address 750.

In another example of fulfilling a transaction using proxy wallet 730, the privacy service 720 receives a transaction signed by multisig wallet 710 (e.g., signed by a key of multisig wallet 710), where multisig wallet 710 identifies the address corresponding to the user proxy key. The privacy service 720 uses the address of the user proxy key to verify the signature of the user proxy key and determine which privacy service key to use. In determining which privacy service key to use, the privacy service 720 also determines which proxy wallet to forward the transaction. Because a proxy wallet can be associated with a user proxy key and a privacy service key, the privacy service 720 can determine the privacy service key and proxy wallet with the address of the user proxy key.

Privacy service 720, while offering privacy, may, without safeguards, be compromised and cause loss of user control of accounts. For example, privacy service 720 may be hacked, may suffer a power outage, and so on. Embodiments are proposed herein to ensure user control of their accounts in such scenarios. Privacy service 720 is configured to be unable to initiate a transaction on its own; transactions must be initiated by multisig wallet 710, thus ensuring that if privacy service 720 is hacked, the malicious party cannot initiate transactions on behalf of a user of the privacy service. Additional or alternative security measures may be used to ensure the safety and self-sovereignty of an owner of multisig wallet 710 who chooses to use privacy service 720. In an embodiment, a recovery key of multisig wallet 710 may be used to exchange the proxy key. The recovery key, which can also be located in proxy wallet 730, can function similarly to recovery keys 621 or 622 of FIG. 2. The proxy wallet allows a user to recover a key without revealing the connection between a challenge transaction used to recovery the key and the user's multisig wallet. In some embodiments, a hashed connection to the multisig wallet may be used as an additional failsafe. This hashed connection is further described in the description of FIG. 8. Such a recovery key protects the user from a scenario where privacy service 720 becomes unavailable or compromised, or where the user proxy key is lost. The recovery key may be derived from a recovery key of the multisig wallet 710 using key derivation.

Another security measure may include use of a salted hash. FIG. 8 depicts an exemplary process for executing a transaction with a proxy wallet using a salted hash. The salted hash is a last resort mechanism for a user to take control of multisig wallet 810 by giving up the user's privacy. FIG. 8 includes multisig wallet 810, privacy service 820, proxy wallet 830, blockchain 840, and receiver address 850, each of these having like numbering to similar features shown in FIG. 7, and each of which carry the same weight of description of their counterparts described with reference to FIG. 7.

As shown, privacy service 820 is disabled or compromised, and thus multisig wallet 810 directly accesses proxy wallet 830 to perform a transaction. For this purpose, a salted hash is stored in proxy wallet 830. This hash can only be created using the address of multisig wallet 810, the address of proxy wallet 830, and the "salt" (that is, an additional secret such as random data that may be used as an additional input to a hash function). With the "salt" it is ensured that the information of proxy wallet 830 does not allow any conclusion about multisig wallet 810 and its keys. In this way, no other user is able to reproduce the hash even if that user knows the public address from multisig wallet 810. However, as soon as a transaction is executed using multisig wallet 810, a connection between multisig wallet 810 and proxy wallet 830 is established, which means that privacy is lost. This ensures that even if the privacy service fails or is corrupted and the user proxy key and recovery key are lost, multisig wallet 810 retains control of the proxy wallet 830 and therefore the assets. That is, the multisig wallet 810 can sign a transaction using a transaction key (e.g., an initiation key, approval key, recovery key, or any other suitable customizable role for a key) and create the salted hash because the user knows the additional secret, and with this, the multisig wallet 810 can prove that the user is the owner of proxy wallet 830, thus ensuring that the user can recover proxy wallet 830, with the only consequence being a loss of privacy. This ensures that the user can always recover their assets from proxy wallet 830 even if privacy service 820 is compromised.

In an embodiment, a further optimization can be made by replacing the privacy service key and the user proxy key with a multiparty computation signature (MPC). FIG. 9 depicts an exemplary process for executing a transaction with a proxy wallet using a multiparty computation signature. FIG. 9 includes multisig wallet 910, privacy service 920, proxy wallet 930, blockchain 940, and receiver address 950, each of these having like numbering to similar features shown in FIG. 7, and each of which carry the same weight of description of their counterparts described with reference to FIG. 7. In this embodiment, the user (e.g., at their client device) and privacy service 920 each have an MPC keyshare, so that both the user and the privacy service 920 have to participate to generate the required signature. Neither, acting alone, is able to do so. Because the keyshares can be exchanged without changing the public key, key (share) rotation is possible without changing the state of the proxy wallet contract (i.e. without executing a transaction on the block chain). The keys may be rotated to improve the security because a potentially leaked or stolen keyshare would be only valid until the next rotation, giving an attacker only a short time to accessed a user's secured possessions.

Example Processes for Transactions Using Customized Keys or a Privacy Service

Figure 10:
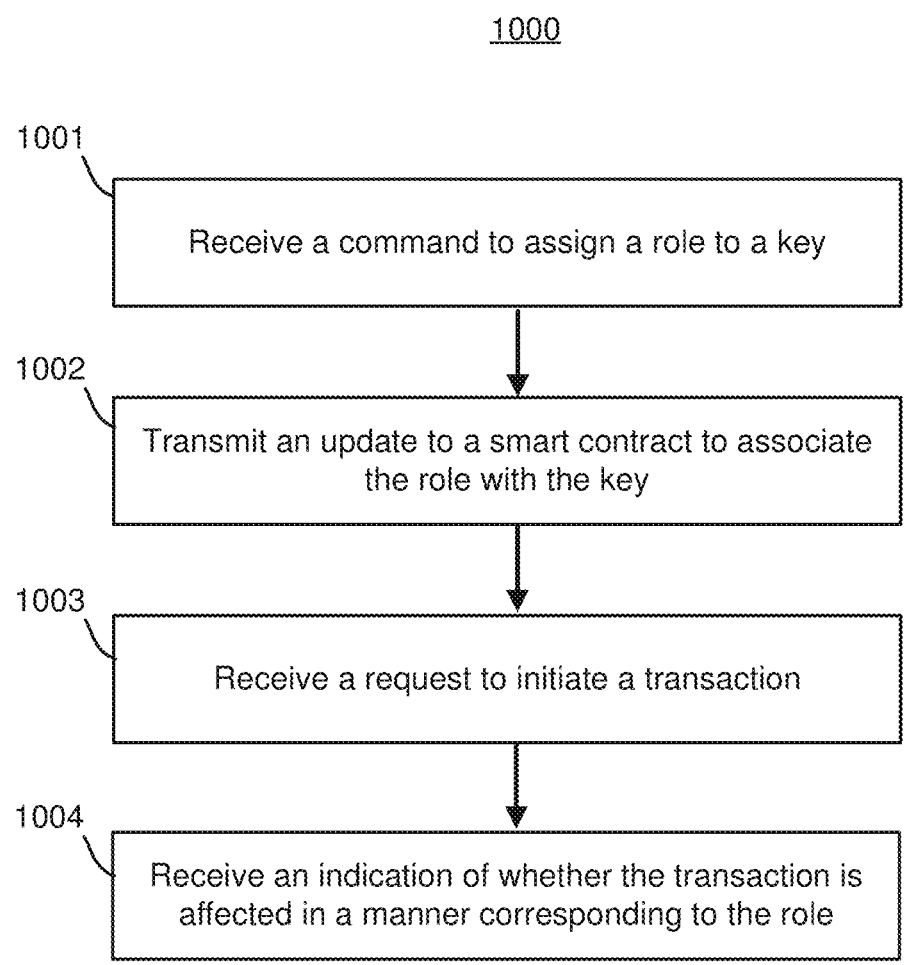
FIG. 10 is a flowchart illustrating a process for initiating a transaction using a customized key, in accordance with one embodiment.

FIG. 10 is a flowchart illustrating process 1000 for initiating a transaction using a customized key, in accordance with one embodiment. A multisignature wallet application may perform process 1000. In some embodiments, the multisignature wallet application performs operations of process 1000 in parallel or in different orders, or may perform different steps.

The multisignature wallet application receives 1001 a command to assign a role to a key. The multisignature wallet application may output a graphical user interface (GUI) including UI elements for user input that enables the multisignature wallet application to receive 1001 a command to assign a role to a key. For example, a user may use a GUI generated by a multisig application on a client device to request two approval keys for a transaction to be processed by a smart contract or a blockchain. The user interface can be output by a device of a custody provider. The key, for which a command was received 1001 for a role to be assigned, can be stored by the custody provider. The role associated with the key can be at least one of a recovery function, approval function, or initiation function.

In some embodiments, the role corresponds to a recovery function and the transaction is a challenge transaction of a first key for replacement by a second key. The first key can be replaced (e.g., by a smart contract) based on a monitoring, during a length of time, for a message signed using the first key. A multisignature wallet application may also perform the monitoring by looking out for transactions signed with the first key. Upon detecting a signature by the first key during the length of time, the challenge transaction can be canceled. Alternatively, upon determining that the length of time has elapsed without detecting the signature, the first key can be replaced with the second key. The length of time can also be reduced upon one or more additional keys signing the challenge transaction. The public addresses of the one or more keys can be associated with the smart contract so that the smart contract can verify the validity of the signatures as belonging to the proper user or user's multisignature wallet (i.e., the user whose keys are being challenged). The amount of time can vary based on which of the one or more additional keys is detected.

The multisignature wallet application transmits 1002 an update to a smart contract to associate the role with the key. In some embodiments, in response to receiving 1001 the command, the multisignature wallet application may transmit an update to a smart contract to associate the role with the key. For example, for two approval keys requested by a user, the multisignature wallet application transmits 1002 an update specifying the two requested approval key roles. An update may include a public key or an address of the public key of a keypair and a user-specified role to be associated with the keypair by the smart contract. The key may be associated with a multisignature wallet. For example, the user requesting the two approval keys may have a multisignature wallet with existing approval keys, and the smart contract will associate two new key addresses with the two newly requested approval keys.

The multisignature wallet application receives 1003 a request to initiate a transaction. For example, the user may sign a transaction using an initiation key of their multisignature wallet to request to initiate the transaction. In another example, a user signs a challenge transaction using a recovery key of their multisignature wallet to request that a previously assigned key (e.g., an initiation key of a user who can no longer access their multisignature wallet) in another user's multisignature wallet be replaced with a new key (e.g., a new initiation key). The transaction is affected based on whether a given key having the role signs the transaction. For example, the transaction may be initiate unless signed by the initiation key, or the initiated transaction signed by the initiation key may not be approved unless signed by an approval key. In another example, a challenge transaction may be unsuccessful if the challenged key signs the challenge transaction, or the challenge transaction may be successful if the challenged key fails to sign the challenge transaction a particular period of time (e.g., six months) after the recovery key signs the challenge transaction. In response to the key assigned with the role signing the transaction, the transaction can be affected in a corresponding manner. For example, in response to an approval key signing a transaction, the transaction can be processed by a blockchain.

The multisignature wallet application receives 1004 an indication of whether the transaction is affected in a manner corresponding to the role. In one example, the multisignature wallet application receives a confirmation that a transaction signed by an approval key has been executed by a blockchain. In another example, the multisignature wallet application receives a confirmation that a challenge transaction was blocked in response to the smart contract receiving a signature of the challenge transaction using a key of a user whose key(s) were being challenged.

Figure 11:
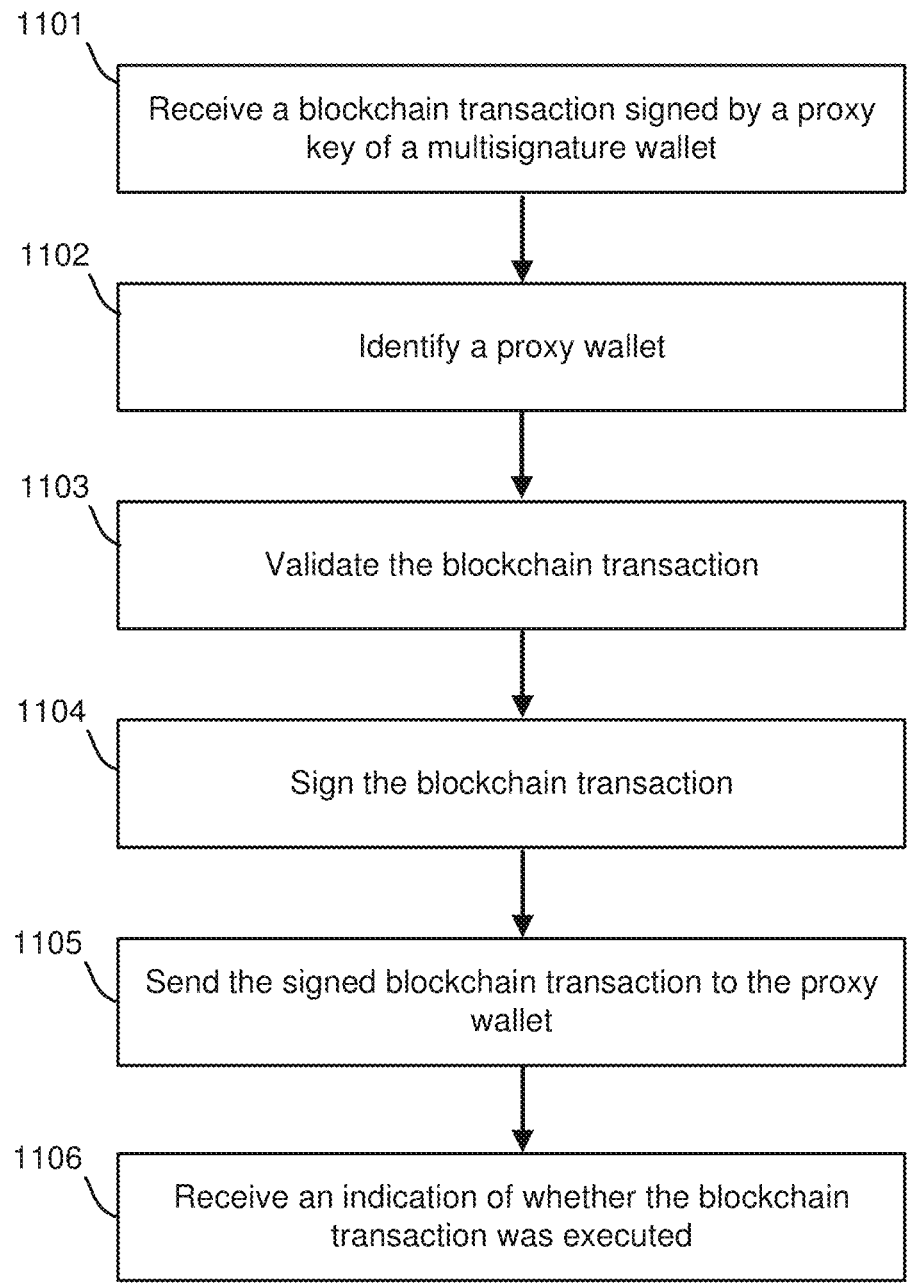
FIG. 11 is a flowchart illustrating a process for initiating a blockchain transaction using a privacy service, in accordance with one embodiment.

FIG. 11 is a flowchart illustrating process 1100 for initiating a blockchain transaction using a privacy service, in accordance with one embodiment. A privacy service as described herein (e.g., privacy services 720, 820, or 920) may perform process 1100. In some embodiments, the privacy service performs operations of process 1100 in parallel or in different orders, or may perform different steps.

The privacy service receives 1101 a blockchain transaction signed by a proxy key of a multisignature wallet. For example, a multisignature wallet initiates a transaction by using an initiation key or an address of the key to sign the transaction. The privacy service identifies 1102 a proxy wallet. The privacy service may identify 1102 the proxy wallet using the signature of the transaction. For example, a proxy wallet may be associated with a pair of keys: the proxy key and a privacy service key, each having corresponding addresses. Using the address of the proxy key, the privacy service identifies 1102 the proxy wallet associated with the corresponding proxy key. The privacy service validates 1103 the blockchain transaction. For example, the privacy service verifies that all rules of a multisignature smart contract are fulfilled. The privacy service signs 1104 the blockchain transaction. The privacy service can sign 1104 the blockchain transaction using a key of the proxy wallet. For example, the privacy service may sign using the privacy service key or use both the proxy key and the privacy service key to generate an MPC to sign the transaction. The privacy service sends 1105 the signed blockchain transaction to the proxy wallet. In this way, a signature by one or more keys of the proxy wallet can cause a transaction to be executed. Alternatively, a multisignature wallet can sign 1104 the blockchain transaction key using a salted hash generated using an address of the proxy wallet, an address of the multisignature wallet, and a salt. The multisignature wallet can send 1105 the signed blockchain transaction to the proxy wallet. The privacy service receives 1106 an indication of whether the blockchain transaction was executed. For example, the proxy wallet may receive a confirmation that the blockchain transaction was executed after the proxy wallet sends the transaction to a blockchain (e.g., blockchain 740, 840, or 940), and the proxy wallet may provide the confirmation to the privacy service in turn.

The privacy service key can be an approval key of the proxy wallet. Validating the blockchain transaction can include determining that the transaction conforms to a compliance protocol. The proxy key can be an initiation key of the proxy wallet. In some embodiments, signing the blockchain transaction using the proxy wallet includes signing the blockchain transaction using a key of the proxy wallet.

Figure 12:
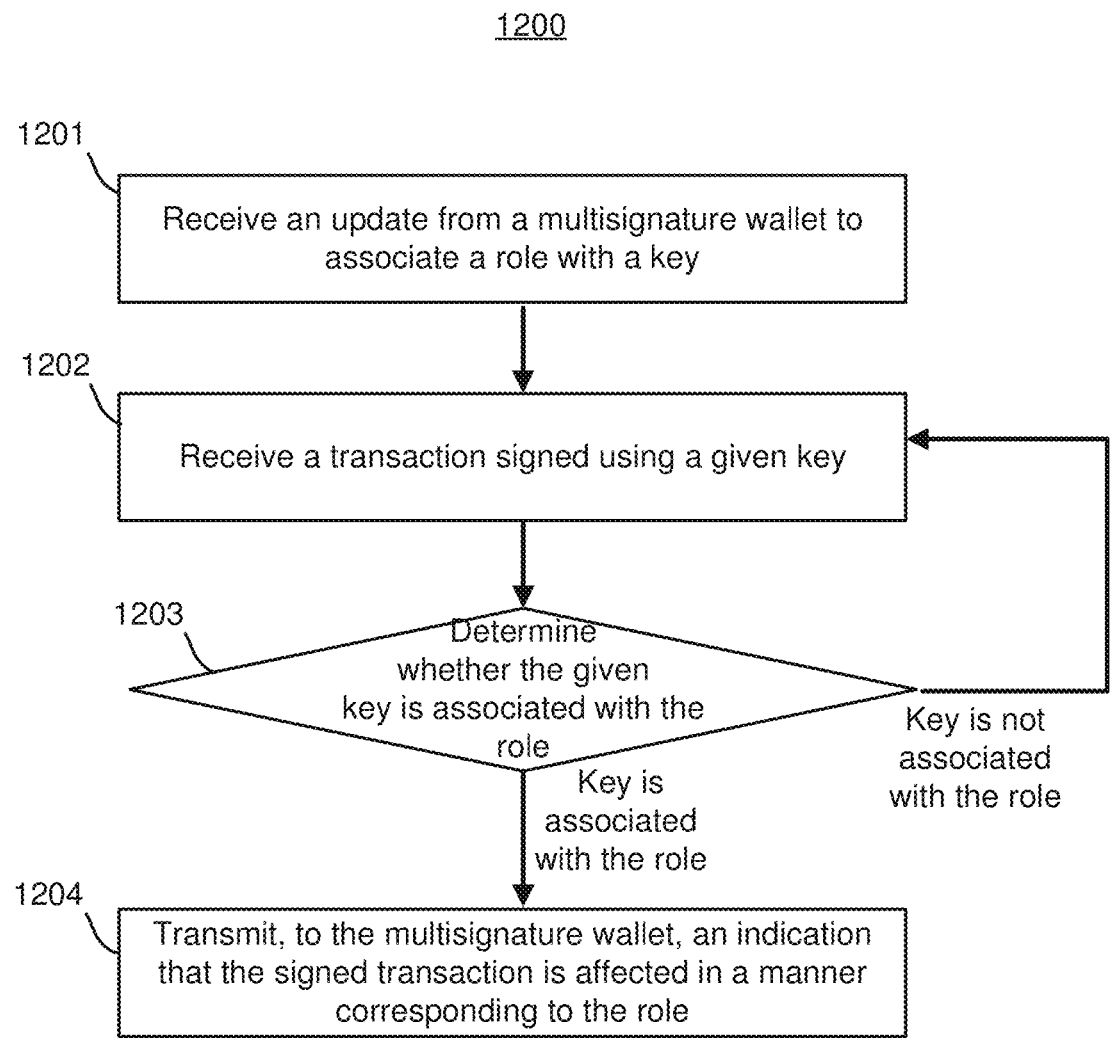
FIG. 12 is a flowchart illustrating a process for initiating a transaction using a smart contract, in accordance with one embodiment.

FIG. 12 is a flowchart illustrating process 1200 for initiating a transaction using a smart contract, in accordance with one embodiment. A smart contract or blockchain on which a smart contract runs may perform the process 1200. In some embodiments, the smart contract performs operations of process 1200 in parallel or in different orders, or may perform different steps. The smart contract receives 1201 an update from a multisignature wallet to associate a role with a key. The key can be associated with the multisignature wallet (e.g., a key of the wallet). The smart contract receives 1202 a transaction signed using a given key. The smart contract determines 1203 whether the given key is associated with the role associated with the key (e.g., determining if the public address of the given key matches the public address of the key indicated through the received 1201 update). If the key is associated with the role, the smart contract may transmit 1204 an indication to the multisignature wallet that the signed transaction is affected in a manner corresponding to the role of the key (e.g., a signed challenge transaction is affected by initiating a countdown timer for a challenged user's keys to sign and block the challenge transaction or a transaction signed by an approval key is forwarded to a blockchain for processing after determining the approval key has a public address that matches an address of record on the smart contract). In some embodiments, the smart contract may provide the signed transaction to a blockchain for processing in addition or alternative to transmitting 1204 the indication to the multisignature wallet. Although the smart contract is shown in FIG. 12 as transmitting 1204 the indication, the smart contract may not provide an indication in response to determining the key is associated with the role. If the key is not associated with the role, the smart contract may return to receiving 1202 a transaction signed using a given key.

In some embodiments, the role corresponds to a recovery function, wherein the transaction is a challenge transaction of one key for replacement by another key. The smart contract can replace the key in response to receiving a notification from the multisignature wallet that, during a length of time, a message was signed using the key and that in response to the message being signed, the challenge transaction was blocked by the multisignature wallet. The smart contract can replace, upon to determining that the length of time has elapsed without the message being signed, the key with the other key. In some embodiments, the smart contract can determine 1203 whether the second key is associated with the role associated with the first key by determining whether a public address of the second key is the same as a public address of the first key.

Computing Machine Architecture

Figure 13:
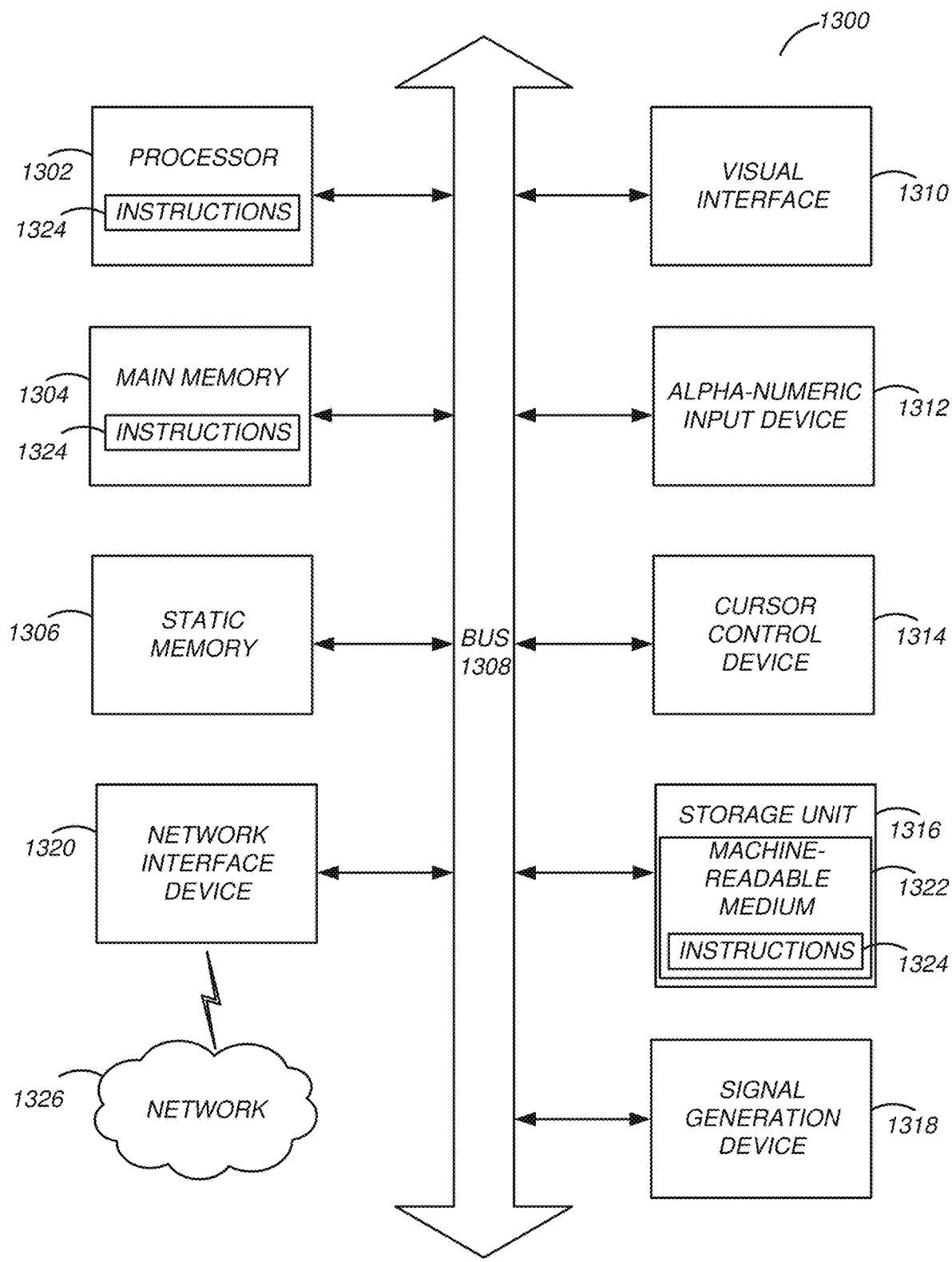
FIG. 13 is a block diagram illustrating components of an example machine able to read instructions from a machine-readable medium and execute them in a processor (or controller).

FIG. (FIG. 13 is a block diagram illustrating components of an example machine able to read instructions from a machine-readable medium and execute them in a processor (or controller). Specifically, FIG. 13 shows a diagrammatic representation of a machine in the example form of a computer system 1300 within which program code (e.g., software) for causing the machine to perform any one or more of the methodologies discussed herein may be executed. In some of the described configurations, the methodologies were described via functional configurations of the modules. The modules may be comprised of program code that itself may be comprised of one or more instructions 1324 that may be stored in a non-transitory computer readable storage medium and may be executable by one or more processors 1302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes a processor 1302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1304, and a static memory 1306, which are configured to communicate with each other via a bus 1308. The computer system 1300 may further include visual display interface 1310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1310 may include or may interface with a touch enabled screen. The computer system 1300 may also include alphanumeric input device 1312 (e.g., a keyboard or touch screen keyboard), a cursor control device 1314 (e.g., a mouse, a trackball, a joystick, a motion sensor, or other pointing instrument), a storage unit 1316, a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The systems and methods disclosed herein offer advantages in security and integrity of blockchain keys. Customization of keys enables users to configure security on their keys as desired. Smart contract storage of the right of keys enables keys to be securely stored by a custody provider while ensuring that the rights of those keys are decentralized, transparent, and recoverable and to enforce these rights on blockchain level. Recovery keys enable users to avoid a single chain of failure, such as their death or incapacitation, or theft or loss of devices, from causing funds to be irretrievably lost or accessed without additional authorization.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system and/or a distributed peer-to-peer network) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time.

For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a custody provider and customization of keys through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising acts of:
   transmitting an update to a smart contract to associate a role with a key, the key associated with a multisignature wallet;
   receiving a request to initiate a transaction, the transaction effected based on whether a given key having the role signs the transaction; and
   receiving, from the smart contract, an indication of whether the transaction is effected in a manner corresponding to the role, wherein:
   the role corresponds to a recovery function;
   the transaction is a challenge transaction of a first key for replacement by a second key;
   the first key is replaced based on a monitoring, during a length of time, for a message signed using the first key;
   responsive to detecting a signature by the first key during the length of time, the challenge transaction is blocked;
   responsive to determining that the length of time has elapsed without detecting the signature, the first key is replaced with the second key;
   the length of time is reduced responsive to at least one of one or more additional keys signing the challenge transaction; and
   public addresses of the one or more additional keys are associated with the smart contract.

2. The method of claim 1, wherein an amount of reduction in the length of time varies based on which of the one or more additional keys is detected.

3. The method of claim 1, further comprising an act of receiving, by a user interface, a command to assign the role to the key, and wherein transmitting the update is responsive to receiving the command.

4. The method of claim 3, wherein at least a portion of information associated with the user interface is received from a custody provider, and wherein the key is stored by the custody provider.

5. The method of claim 1, wherein the update comprises a first update and the role comprises a first role, and wherein the method further comprises an act of:
   transmitting a second update to the smart contract to associate a second role with a third key, the third key associated with the multisignature wallet, wherein the second role corresponds to an initiation function.

6. The method of claim 5, wherein the transaction comprises a first transaction, and wherein the method further comprises an act of:
   transmitting, to the smart contract, a second transaction signed by the third key associated with the second role corresponding to the initiation function, wherein the smart contract is configured to selectively execute the second transaction based on whether the second transaction is signed by a requisite number of one or more fourth keys associated with a third role corresponding to an approval function.

7. The method of claim 5, further comprising an act of:
   transmitting a third update to the smart contract to associate a third role with a fourth key, the fourth key associated with the multisignature wallet, wherein the third role corresponds to an approval function.

8. At least one non-transitory computer-readable medium with instructions encoded thereon, the instructions, when executed by one or more processors, causing the one or more processors to:
   transmit an update to a smart contract to associate a role with a key, the key associated with a multisignature wallet;
   receive a request to initiate a transaction, the transaction effected based on whether a given key having the role signs the transaction; and
   receive, from the smart contract, an indication of whether the transaction is effected in a manner corresponding to the role, wherein:
   the role corresponds to a recovery function;
   the transaction is a challenge transaction of a first key for replacement by a second key;
   the first key is replaced based on a monitoring, during a length of time, for a message signed using the first key;
   responsive to detecting a signature by the first key during the length of time, the challenge transaction is blocked;
   responsive to determining that the length of time has elapsed without detecting the signature, the first key is replaced with the second key;
   the length of time is reduced responsive to at least one of one or more additional keys signing the challenge transaction; and
   public addresses of the one or more additional keys are associated with the smart contract.

9. The at least one non-transitory computer-readable medium of claim 8, wherein an amount of reduction in the length of time varies based on which of the one or more additional keys is detected.

10. The at least one non-transitory computer-readable medium of claim 8, further comprising instructions that, when executed by the one or more processors cause the one or more processors to receive, by a user interface, a command to assign the role to the key, wherein the update is transmitted responsive to receiving the command.

11. The at least one non-transitory computer-readable medium of claim 10, wherein the user interface is provided by a custody provider, and wherein the key is stored by the custody provider.

12. The at least one non-transitory computer-readable medium of claim 8, wherein the update comprises a first update and the role comprises a first role, and wherein the at least one non-transitory computer-readable medium further comprises instructions that, when executed by the one or more processors, cause the one or more processors to:
   transmit a second update to the smart contract to associate a second role with a third key, the third key associated with the multisignature wallet, wherein the second role corresponds to an initiation function.

13. The at least one non-transitory computer-readable medium of claim 12, wherein the transaction comprises a first transaction, and wherein the at least one non-transitory computer-readable medium further comprises instructions that, when executed by the one or more processors, cause the one or more processors to:
  transmit, to the smart contract, a second transaction signed by the third key associated with the second role corresponding to the initiation function, wherein the smart contract is configured to selectively execute the second transaction based on whether the second transaction is signed by a requisite number of one or more fourth keys associated with a third role corresponding to an approval function.

14. The at least one non-transitory computer-readable medium of claim 12, wherein the at least one non-transitory computer-readable medium further comprises instructions that, when executed by the one or more processors, cause the one or more processors to:
  transmit a third update to the smart contract to associate a third role with a fourth key, the fourth key associated with the multisignature wallet, wherein the third role corresponds to an approval function.

15. A system comprising at least one computer-readable medium with instructions encoded thereon, and one or more processors that, when executing the instructions, perform operations comprising:
  transmitting an update to a smart contract to associate a role with a key, the key associated with a multisignature wallet;
  receiving a request to initiate a transaction, the transaction effected based on whether a given key having the role signs the transaction; and
  receiving, from the smart contract, an indication of whether the transaction is effected in a manner corresponding to the role, wherein:
  the role corresponds to a recovery function;
  the transaction is a challenge transaction of a first key for replacement by a second key;
  the first key is replaced based on a monitoring, during a length of time, for a message signed using the first key;
  responsive to detecting a signature by the first key during the length of time, the challenge transaction is blocked;
  responsive to determining that the length of time has elapsed without detecting the signature, the first key is replaced with the second key;
  the length of time is reduced responsive to at least one of one or more additional keys signing the challenge transaction; and
  public addresses of the one or more additional keys are associated with the smart contract.

16. The system of claim 15, wherein an amount of reduction in the length of time varies based on which of the one or more additional keys is detected.

17. The system of claim 15, wherein the operations further comprise receiving, by a user interface, a command to assign the role to the key, and wherein transmitting the update is responsive to receiving the command.

18. The system of claim 16, wherein the user interface is provided by a custody provider, and wherein the key is stored by the custody provider.

19. The system of claim 15, wherein the update comprises a first update and the role comprises a first role, and wherein the operations further comprise:
  transmitting a second update to the smart contract to associate a second role with a third key, the third key associated with the multisignature wallet, wherein the second role corresponds to an initiation function.

20. The system of claim 19, wherein the transaction comprises a first transaction, and wherein the operations further comprise:
  transmitting, to the smart contract, a second transaction signed by the third key associated with the second role corresponding to the initiation function, wherein the smart contract is configured to selectively execute the second transaction based on whether the second transaction is signed by a requisite number of one or more fourth keys associated with a third role corresponding to an approval function.

21. The system of claim 19, wherein the operations further comprise:
  transmitting a third update to the smart contract to associate a third role with a fourth key, the fourth key associated with the multisignature wallet, wherein the third role corresponds to an approval function.

* * * * *